United States Patent
Machida

(10) Patent No.: US 11,212,694 B2
(45) Date of Patent: Dec. 28, 2021

(54) COMMUNICATION DEVICE, CONTROL DEVICE, COMMUNICATION METHOD, AND COMMUNICATION PROGRAM

(71) Applicant: HAPSMOBILE Inc., Tokyo (JP)

(72) Inventor: Akinori Machida, Tokyo (JP)

(73) Assignee: HAPSMOBILE Inc., Tokyo (JP)

(*) Notice: Subject to any disclaimer, the term of this patent is extended or adjusted under 35 U.S.C. 154(b) by 0 days.

(21) Appl. No.: 17/184,719

(22) Filed: Feb. 25, 2021

(65) Prior Publication Data

US 2021/0185555 A1    Jun. 17, 2021

Related U.S. Application Data

(63) Continuation of application No. PCT/JP2019/034862, filed on Sep. 4, 2019.

(30) Foreign Application Priority Data

Sep. 21, 2018 (JP) .............................. JP2018-178138

(51) Int. Cl.
*H04B 7/185* (2006.01)
*H04W 28/02* (2009.01)

(52) U.S. Cl.
CPC .... *H04W 28/0231* (2013.01); *H04B 7/18504* (2013.01)

(58) Field of Classification Search
CPC ......... H04L 43/16; H04L 47/10; H04L 47/12; H04L 47/18; H04L 47/801; H04L 47/824;
(Continued)

(56) References Cited

U.S. PATENT DOCUMENTS 8,379,608 B2 * 2/2013 Yamano ................ H04W 28/18
370/338
8,655,553 B2 * 2/2014 Nojima .................. B60L 53/65
701/49
(Continued)

FOREIGN PATENT DOCUMENTS

JP    2009-100107 A    5/2009
JP    2009-290683 A    12/2009
(Continued)

OTHER PUBLICATIONS

Notice of Reasons for Refusal dated May 21, 2020 from counterpart Japanese Patent Application No. 2018-178138 with English translation.

*Primary Examiner* — Alpus Hsu
(74) *Attorney, Agent, or Firm* — DLA Piper LLP (US)

(57) ABSTRACT

A communication device includes: a clock unit; a communication unit; a power monitor; a communication speed monitor; a communication volume monitor; a time period identification unit that identifies a time period in which the power consumption of the communication unit exceeds a predetermined power, and a time period in which the communication volume of the communication unit falls below a predetermined communication volume; and a controller that narrows the communication area of the communication unit so that the communication volume monitored by the communication volume monitor is less than or equal to a predetermined communication volume allowed by the communication unit when a current time clocked by the clock unit is in the time period identified by the time period identification unit.

15 Claims, 7 Drawing Sheets

(58) Field of Classification Search
CPC ............ H04L 47/826; H04W 28/0221; H04W 28/0231; H04W 28/0273; H04W 28/0284; H04B 7/18504; H04B 7/18506
See application file for complete search history.

(56) References Cited

U.S. PATENT DOCUMENTS

| | | |
|---|---|---|
| 2009/0098900 A1 | 4/2009 | Okabe |
| 2010/0115593 A1 | 5/2010 | Uchida et al. |
| 2011/0248846 A1* | 10/2011 | Belov ................ H04Q 9/00 340/539.1 |
| 2016/0103162 A1* | 4/2016 | Safa-Bakhsh ........ G01R 21/133 702/62 |
| 2018/0083678 A1 | 3/2018 | Alexander et al. |
| 2019/0246311 A1* | 8/2019 | Aoki .................... H04B 7/0695 |
| 2019/0261223 A1* | 8/2019 | Miyamoto ............ H04W 28/14 |
| 2020/0008110 A1* | 1/2020 | Yousif .................. H04W 48/16 |

FOREIGN PATENT DOCUMENTS

| | | |
|---|---|---|
| JP | 2012-54736 A | 3/2012 |
| JP | 2013-149261 A | 8/2013 |
| JP | 2018-515949 A | 6/2018 |

* cited by examiner

COMMUNICATION DEVICE, CONTROL DEVICE, COMMUNICATION METHOD, AND COMMUNICATION PROGRAM

TECHNICAL FIELD

This disclosure relates to a communication device, a control device, a communication method, and a communication program.

BACKGROUND

A solution has been considered to deal with when a large number of terminals are present in the communication area of a base station conventionally. The technology described in Japanese Laid-Open Patent Publication No. 2012-54736, when the communication area of the base station includes a large number of terminals, controls the load on the base station by changing the tilt angle of the antenna of the base station to reduce the communication area, and also changing the tilt angle of the antenna of the adjacent base station to expand the communication area.

A system in which a radio station is mounted on an aircraft that stays in the air at high altitudes (i.e., high altitude platform system HAPS) has been considered recently. Distributing the radio stations at high altitudes allows the communication area of the radio stations to be wider. However, the radio stations distributed at high altitudes have a relative limit to the volume of traffic they can handle in terms of power consumption and guaranteed communication speed, for example.

It could therefore be helpful to provide a communication device, a control device, a communication method and a communication program capable of flexibly operating a radio station even if the radio station is mounted on an aircraft.

SUMMARY

We thus provide:

A communication device includes: a clock unit that clocks a time; a communication unit that communicates with a plurality of wireless terminals in a predetermined communication area; a power monitor that monitors power consumption of the communication unit; a communication speed monitor that monitors communication speed of the communication performed by the communication unit; a communication volume monitor that monitors a communication volume of the communication performed by the communication unit; a time period identification unit that identifies a time period in which the power consumption of the communication unit exceeds a predetermined power on the basis of the power consumption monitored by the power monitor and the time clocked by the clock unit, and a time period in which the communication speed of the communication unit falls below a predetermined communication speed on the basis of the communication speed monitored by the communication speed monitor and the time clocked by the clock unit; and a controller that narrows the communication area of the communication unit so that the communication volume monitored by the communication volume monitor is less than or equal to a predetermined communication volume allowed by the communication unit when a current time clocked by the clock unit is in the time period identified by the time period identification unit.

The time period identification unit may further identify a time period in which the communication volume of the communication unit exceeds the predetermined communication volume on the basis of the communication volume monitored by the communication volume monitor and the time clocked by the clock unit. The controller may narrow the communication area of the communication unit so that the communication volume monitored by the communication volume monitor is less than or equal to the predetermined communication volume when the current time clocked by the clock unit is in the time period identified by the time period identification unit in which the communication volume exceeds the predetermined communication volume.

The controller may identify in advance areas where a large number of wireless terminals are present, set in advance a communication area other than the identified areas, and narrow the communication area of the communication unit on the basis of the setting.

The communication area other than the identified areas, which is set by the controller, may include a plurality of communication areas, and the controller may narrow the communication area of the communication unit by applying one of a plurality of settings according to the current time clocked by the clock unit.

The communication unit may be located on an aircraft that flies over a predetermined area.

A control device includes: a clock unit that clocks a time; a power monitor that monitors a power consumption when communication is performed; a communication speed monitor that monitors a communication speed when communication is performed; a communication volume monitor that monitors a communication volume when communication is performed; a time period identification unit that identifies a time period in which the power consumption when the communication is performed exceeds a predetermined power on the basis of the power consumption monitored by the power monitor and the time clocked by the clock unit, and a time period in which the communication speed when the communication is performed falls below a predetermined communication speed on the basis of the communication speed monitored by the communication speed monitor and the time clocked by the clock unit; and a controller that narrows the communication area when the communication is performed so that the communication volume monitored by the communication volume monitor is less than or equal to a predetermined communication volume allowed when the communication is performed, when a current time clocked by the clock unit is in the time period identified by the time period identification unit.

A communication method causes a computer including a communication unit that communicates with a plurality of wireless terminals in a predetermined communication area to perform the steps of: clocking a time; monitoring power consumption of the communication unit; monitoring communication speed of the communication unit; monitoring a communication volume of the communication performed by the communication unit; identifying a time period in which the power consumption of the communication unit exceeds a predetermined power on the basis of the power consumption monitored in the power monitoring step and the time clocked in the time clocking step, and a time period in which the communication speed of the communication unit falls below a predetermined communication speed on the basis of the communication speed monitored in the communication speed monitoring step and the time clocked in the time clocking step; and narrowing the communication area of the communication unit so that the communication volume monitored in the communication volume monitoring step is less than or equal to a predetermined communication volume allowed by the communication unit when a current time clocked in the time clocking step is in the time period identified in the time period identifying step.

A non-transitory computer readable recording medium storing a communication program causes a computer to perform the functions of: clocking a time; communicating with a plurality of wireless terminals in a predetermined communication area; monitoring power consumption of the communicating function; monitoring communication speed of the communicating function; monitoring a communication volume of the communication performed by the communicating function; identifying a time period in which the power consumption of the communicating function exceeds a predetermined power on the basis of the power consumption monitored by the power monitoring function and the time clocked by the time clocking function, and a time period in which the communication speed of the communicating function falls below a predetermined communication speed on the basis of the communication speed monitored by the communication speed monitoring function and the time clocked by the time clocking function; and narrowing the communication area of the communicating function so that the communication volume monitored by the communication volume monitoring function is less than or equal to a predetermined communication volume allowed by the communicating function when a current time clocked by the time clocking function is in the time period identified by the time period identifying function.

We thus provide a communication device, a control device, a communication method, and a communication program that are capable of flexibly operating a communication unit even if the communication unit is mounted on an aircraft.

DESCRIPTION OF REFERENCE NUMERALS

Figure 1:
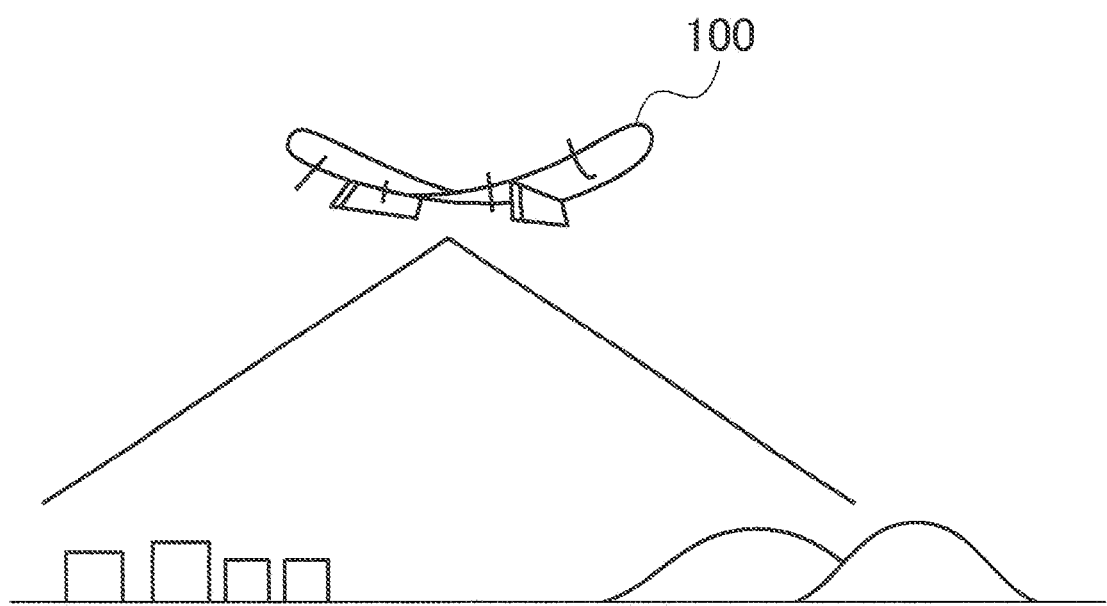
FIG. 1 is a diagram illustrating a communication device according to an example.

1: communication device
11: first communication unit
21: control device
22: second communication unit
23: clock unit
24: power monitor
25: communication speed monitor
26: communication volume monitor
27: time period identification unit
28: controller
51: wireless terminal
100: aircraft

DETAILED DESCRIPTION

Examples of our devices, methods and programs will be described below.

Figure 2:
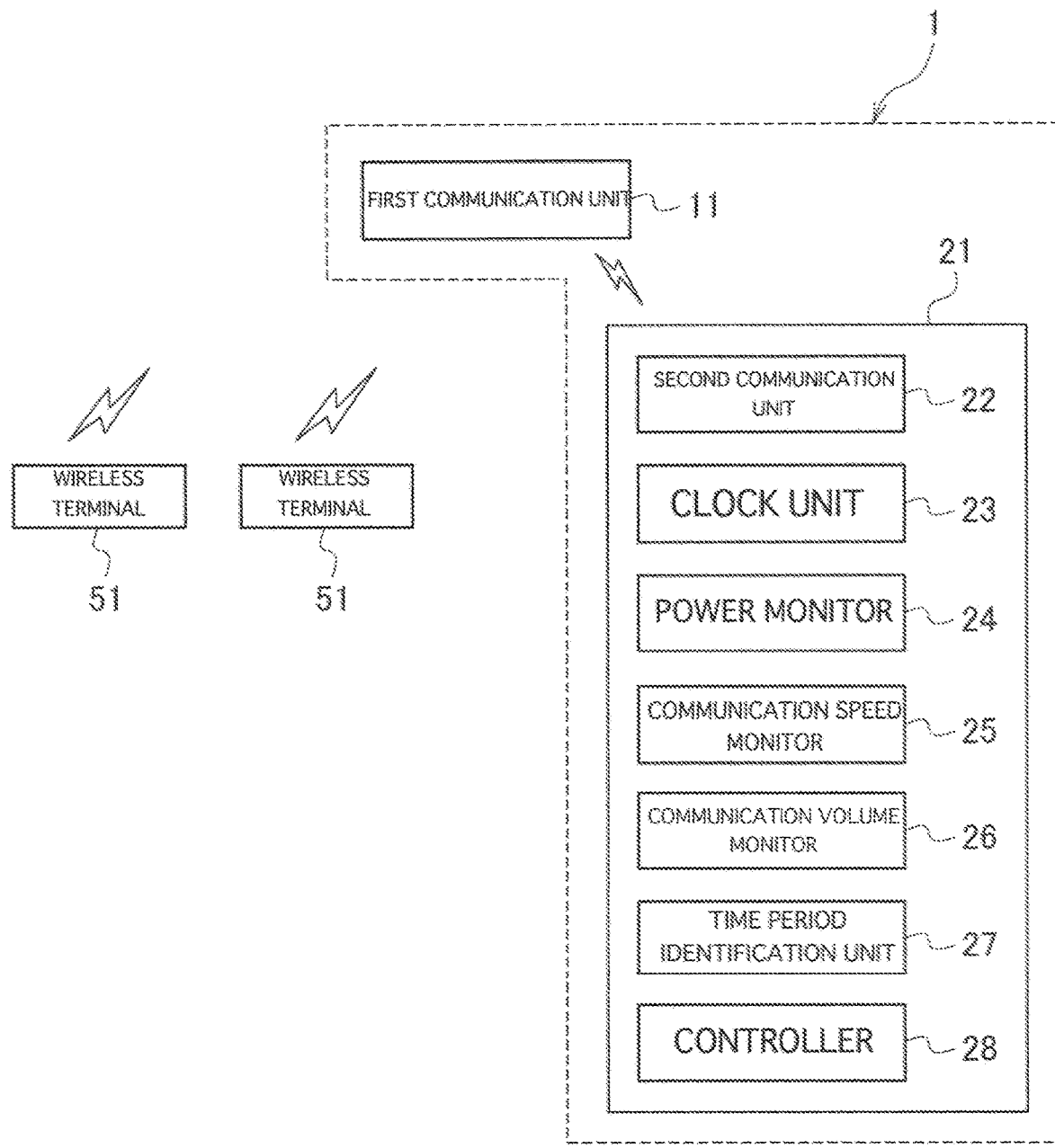
FIG. 2 is a block diagram illustrating a communication device according to an example.

FIG. 1 is a diagram illustrating a communication device according to an example. FIG. 2 is a block diagram illustrating a communication device according to an example.

The communication device 1 shown in FIG. 2 includes a first communication unit 11 and a control device 21. The first communication unit 11 corresponds to a "communication unit." The first communication unit 11 is distributed in an aircraft 100, as shown in FIG. 1, that stays in the air over a predetermined area. The aircraft 100, as an example, stays at an altitude of about 20 km and configures a high altitude platform system (HAPS) on which at least the first communication unit 11 is mounted. The aircraft 100 may include, for example, airplanes, airships, balloons, and drones.

The first communication unit 11 communicates with wireless terminals 51 using mobile communication technology. The wireless terminals 51 may include, for example, cell phones, smartphones, and tablet terminals.

The first communication unit 11 communicates with a plurality of wireless terminals 51 on the ground within a predetermined communication area. For example, the first communication unit 11 may be configured with some or all of the functions of the base station distributed on the ground. The communication area of the first communication unit 11 is configured by a plurality of cells, for example. The first communication unit 11 changes the size of the communication area (footprint) by performing beam-forming based on the adjustment of the antennas corresponding to the cells, for example. This allows the first communication unit 11 to reduce the communication area.

In addition, the first communication unit 11 communicates wirelessly with the second communication unit 22 of the control device 21 described below.

The control device 21 includes the second communication unit 22, a clock unit 23, a power monitor 24, a communication speed monitor 25, a communication volume monitor 26, a time period identification unit 27, and a controller 28.

The control device 21 may be directed to a server or computer, for example. The control device 21 may be distributed on the ground, for example. A description will be given with a configuration in which the control device 21 is distributed on the ground. In a variation, various configurations may be employed such as a configuration in which the clock unit 23, second communication unit 22, time period identification unit 27, and controller 28 may be distributed on the ground, and the power monitor 24, communication speed monitor 25, and communication volume monitor 26 are distributed on the aircraft, for example. It is preferable that the second communication unit 22 and the controller 28 be distributed on the ground.

The second communication unit 22 communicates wirelessly with the first communication unit 11.

The clock unit 23 includes a clock function to clock the time.

The power monitor 24 monitors the power consumption of the first communication unit 11. The power monitor 24 monitors the power consumption of the first communication unit 11 in real time or at predetermined time intervals, for example. For example, if the volume of the communication between the first communication unit 11 and the wireless terminals 51 increases, the power consumption of the first communication unit 11 increases as well. The power monitor 24 monitors the power consumption of the first communication unit 11 as described above. If some of the components of the control device 21 are mounted on the aircraft 100, the power monitor 24 may monitor the power consumption of the components mounted on the aircraft 100 as a whole.

The communication speed monitor 25 monitors the communication speed of the communication performed by the first communication unit 11. The communication speed monitor 25 monitors the communication speed of the communication with the plurality of wireless terminals 51, for example, performed by the first communication unit 11 in real time or at predetermined times. For example, if the communication performed between the first communication unit 11 and the wireless terminal 51 increases, the communication speed of the communication performed by the first communication unit 11 decreases. The communication speed monitor 25 monitors the communication speed of the communication by the first communication unit 11 as described above.

The communication volume monitor 26 monitors the communication volume of the communication performed by the first communication unit 11. That is, the communication volume monitor 26 monitors the volume of traffic when the first communication unit 11 and the wireless terminals 51 communicate with each other.

The time period identification unit 27 identifies the time period in which the power consumption of the first communication unit 11 exceeds the predetermined power on the basis of the power consumption monitored by the power monitor 24 and the time clocked by the clock unit 23. The time period identification unit 27 identifies the time period in which the communication speed of the first communication unit 11 falls below a predetermined communication speed on the basis of the communication speed monitored by the communication speed monitor 25 and the time clocked by the clock unit 23.

The predetermined power is predetermined to be a numerical value that is less than the power generated in the aircraft 100. Regarding the predetermined communication speed, for example, a numerical value that does not cause congestion in the communication by the first communication unit 11 and/or a numerical value that does not cause the user of the wireless terminal 51 to feel discomfort with respect to the communication speed is predetermined.

If the power consumed by the first communication unit 11 exceeds the predetermined power at around 12:00 and 21:00, as an example, the time period identification unit 27 identifies the time around 12:00 and 21:00 as the time periods in which the power consumed by the first communication unit 11 exceeds the predetermined power. In the same manner, if the power consumed by the first communication unit 11 exceeds the predetermined power in the time periods of 12:00-13:00 and 20:00-23:00, as an example, the time period of 12:00-13:00 and the time period of 20:00-23:00 are identified as the time periods in which the power consumed by the first communication unit 11 exceeds the predetermined power.

Even if the communication speed monitor 25 monitors the communication speed of the communication performed by the first communication unit 11, the time period identification unit 27 identifies the time periods in the same manner as in the power consumption monitored by the power monitor 24 above.

The time period identification unit 27 further identifies the time period in which the communication volume of the first communication unit 11 exceeds the predetermined communication volume on the basis of the communication volume monitored by the communication volume monitor 26 and the time clocked by the clock unit 23. The time period identification unit 27 identifies the time period in which the traffic volume of the first communication unit 11 increases. As the predetermined communication volume, a numerical value in which the communication volume of the first communication unit 11 is less than the limit (capacity limit) of the allowable communication volume is predetermined. As in power monitoring, the time period identification unit 27 identifies the time periods in which the communication volume of the first communication unit 11 exceeds the predetermined communication volume, for example, a time period in which the communication volume exceeds the predetermined communication volume at around 12:00 and 21:00, or a time period in which the communication volume exceeds the predetermined communication volume at around 12:00-13:00 and 20:00-23:00.

As for the power monitoring by the power monitor 24, the communication speed monitoring by the communication speed monitor 25, or the communication volume monitoring by the communication volume monitor 26, data is acquired on the basis of monitoring the power, communication speed, or communication volume for a predetermined period of time in advance. The time period identification unit 27 identifies in advance the time period in which the power or communication volume exceeds the reference value and the time period in which the communication speed falls below the reference value.

The controller 28 narrows the communication area of the first communication unit 11 so that the communication volume monitored by the communication volume monitor 26 is less than or equal to the predetermined communication volume allowed by the communication unit 11 when the current time clocked by the clock unit 23 is in the time period identified by the time period identification unit 27. The controller 28 identifies in advance areas where the number of wireless terminals is large, sets in advance a communication area other than the identified areas, and narrows the communication area of the first communication unit 11 on the basis of the setting.

The areas where the number of the wireless terminals is large are identified in advance on the basis of, for example, the population distribution per square kilometer that has been surveyed in advance and the electric field strength of the base stations distributed on the ground at a time when they communicate with the wireless terminals 51. The controller 28 sets in advance communication areas excluding areas with the large number of wireless terminals 51 identified in advance. When narrowing the communication area of the first communication unit 11, the controller 28 narrows the communication area (footprint) of the first communication unit 11 on the basis of the setting.

That is, the controller 28 controls the first communication unit 11 to be a preset communication area so that the communication volume of the first communication unit 11 is less than or equal to a predetermined communication volume, assuming that when the current time clocked by the clock unit 23 is in the time period identified by the time period identification unit 27, the communication of the first communication unit 11 may become congested due to increased communication to the first communication unit 11 and the power consumption of the first communication unit 11 may exceed the predetermined power. The predetermined communication volume allowed by the first communication unit 11 may be directed to, for example, a predetermined value less than the capacity limit of the communication volume of the first communication unit 11.

If the area with the large number of wireless terminals 51 differs depending on the time period, for example, the controller 28 is capable of narrowing the communication area of the first communication unit 11 in accordance with the time period. That is, the controller 28 sets in advance communication areas excluding areas with the large number of wireless terminals 51 identified in advance in accordance with the time period. The controller 28 then may narrow the communication area of the first communication unit 11 by applying a setting according to the current time clocked by the clock unit 23.

In addition, the controller 28 narrows the communication area of the first communication unit 11 so that the communication volume monitored by the communication volume monitor 26 is less than or equal to the predetermined communication volume when the current time clocked by the clock unit 23 is in the time period identified by the time period identification unit 27 in which the communication volume exceeds the predetermined communication volume. The controller 28 sets in advance communication areas excluding areas with the large number of wireless terminals 51 that have been identified in advance in the same way as described above. When narrowing the communication area of the first communication unit 11, the controller 28 narrows the communication area (footprint) of the first communication unit 11 on the basis of the setting. That is, the controller 28 controls the first communication unit 11 to be a preset communication area so that the communication volume of the first communication unit 11 is less than or equal to a predetermined communication volume, assuming that when the current time clocked by the clock unit 23 is in the time period identified by the time period identification unit 27, the communication volume of the first communication unit 11 may exceed the predetermined communication volume.

Next, a communication control method will be described.

First, the way of identifying the time period by the time period identification unit 27 will be described.

Figure 3A:
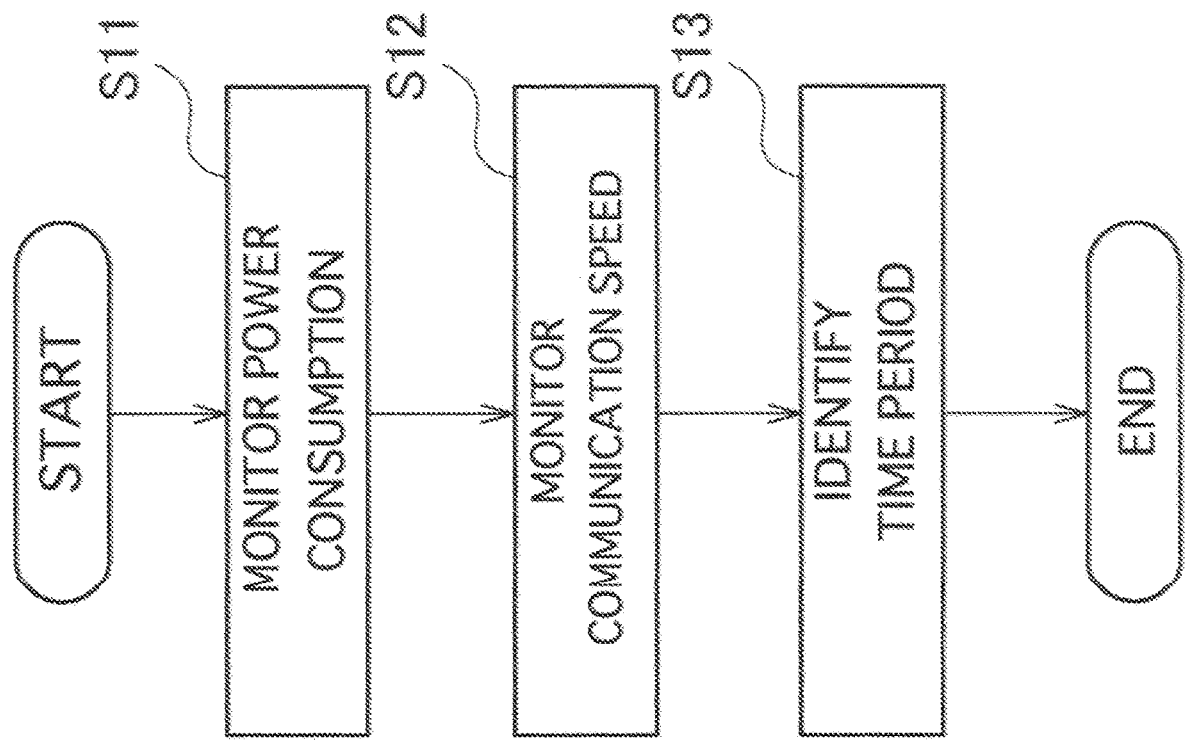
FIG. 3A is a flowchart illustrating an example of identifying a time period in which the power consumption of the first communication unit exceeds a predetermined amount of electricity.
Figure 3B:
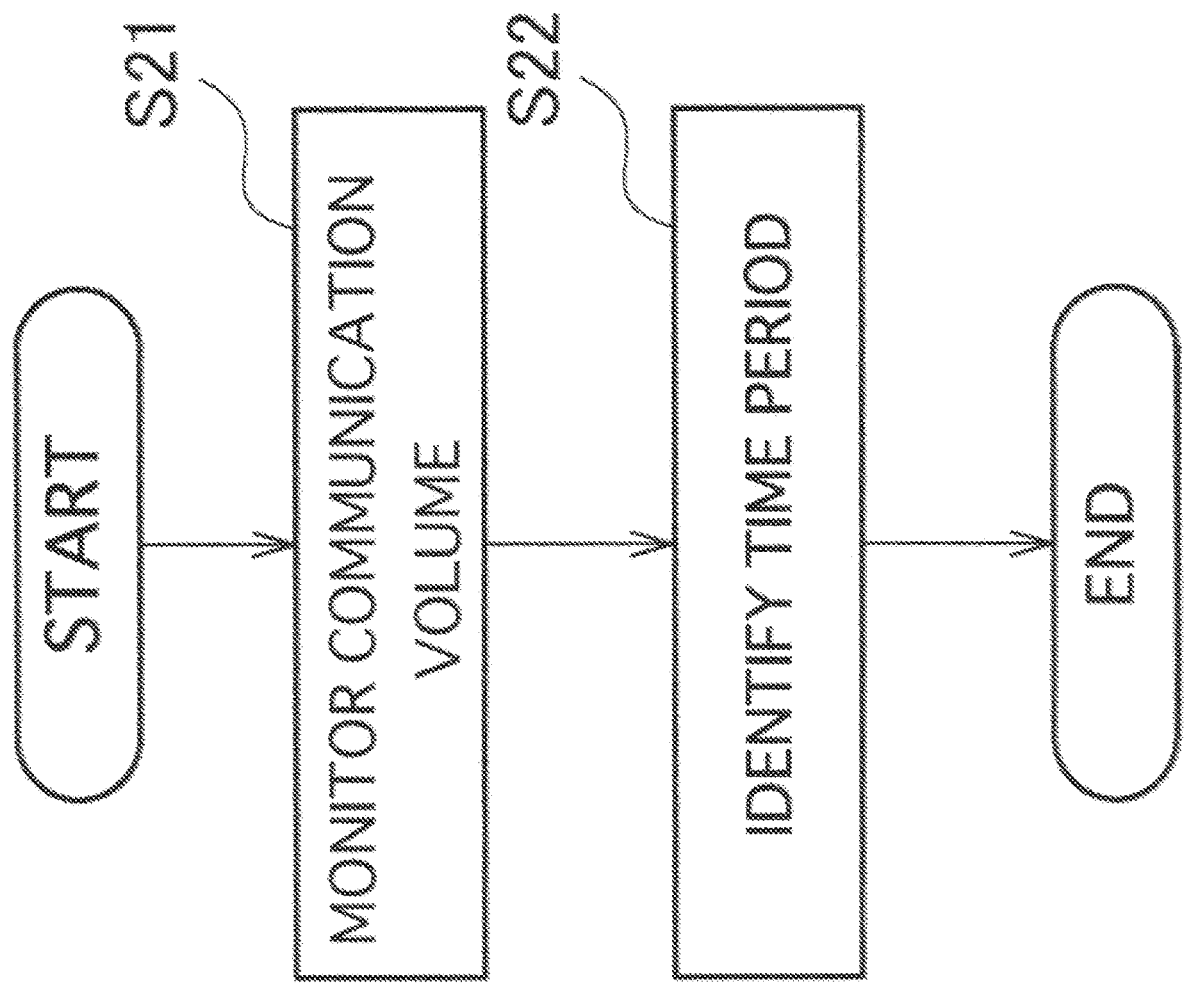
FIG. 3B is a flowchart illustrating an example of identifying a time period in which the communication volume of the first communication unit exceeds a predetermined communication volume.

FIGS. 3A and 3B are flowcharts illustrating an example of identifying a time period. FIG. 3A is a flowchart illustrating an example of identifying a time period in which the power consumption of the first communication unit exceeds a predetermined amount of electricity. FIG. 3B is a flowchart illustrating an example of identifying a time period in which the communication volume of the first communication unit exceeds a predetermined communication volume.

As shown in FIG. 3A, in step S11, the power monitor 24 monitors power consumption of the first communication unit 11. The power monitor 24 monitors power consumption of the first communication unit 11, for example, on the basis of information on the power consumption transmitted from the first communication unit 11 at predetermined time intervals or in real time. The process in step S11 is performed for a predetermined period of time, for example.

In step S12, the communication speed monitor 25 monitors the communication speed of the communication performed by the first communication unit 11. The communication speed monitor 25 monitors the communication speed of the communication between the first communication unit 11 and the plurality of wireless terminals 51, for example, on the basis of information on the communication speed transmitted from the first communication unit 11 at predetermined time intervals or in real time, for example. The process in step S12 is performed for a predetermined period of time, for example. The process in step S11 and the process in step S12 may be performed in the reverse order.

In step S13, the time period identification unit 27 identifies the time period in which the power consumption of the first communication unit 11 exceeds the predetermined power on the basis of the power consumption monitored in step S11 and the time clocked by the clock unit 23. In addition, the time period identification unit 27 identifies the time period in which the communication speed of the first communication unit 11 falls below a predetermined communication speed on the basis of the communication speed monitored in step S12 and the time clocked by the clock unit 23. When the time period identification unit 27 identifies the time period, the time period identification unit stores the information on the identified time period in a storage (not shown). For example, since the process in step S11 and the process in step S12 are performed for a predetermined period of time, the time period identification unit 27 is allowed to identify the time period on the basis of the data for the predetermined period of time.

After step S13, the process is completed.

As shown in FIG. 3B, in step S21, the communication volume monitor 26 monitors the communication volume of the communication performed by the first communication unit 11. For example, the communication volume monitor 26 monitors the communication volume of the first communication unit 11 on the basis of the information on the communication volume transmitted from the first communication unit 11 at predetermined time intervals or in real time, for example. The process in step S21 is performed for a predetermined period of time, for example.

In step S22, the time period identification unit 27 identifies the time period in which the communication volume of the first communication unit 11 exceeds the predetermined communication volume on the basis of the communication volume monitored in step S21 and the time clocked by the clock unit 23. When the time period identification unit 27 identifies the time period, the time period identification unit 27 stores the information on the identified time period in a storage (not shown). For example, since the process in step S21 is performed for a predetermined period of time, the time period identification unit 27 is allowed to identify the time period on the basis of the data for the predetermined period of time.

After step S22, the process is completed.

Next, an example of narrowing the communication area of the first communication unit 11 will be described.

Figure 4:
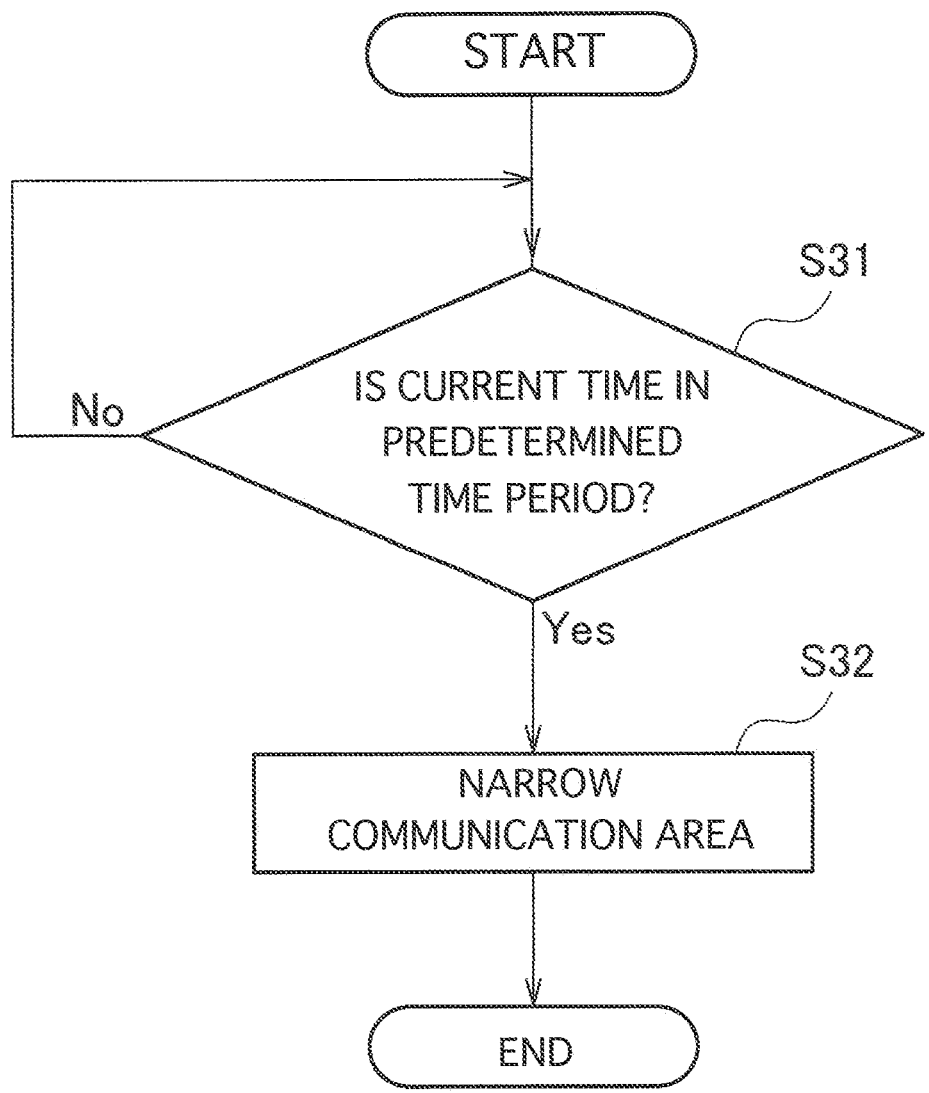
FIG. 4 is a flowchart illustrating an example of narrowing a communication area of the first communication unit.
Figure 5A:
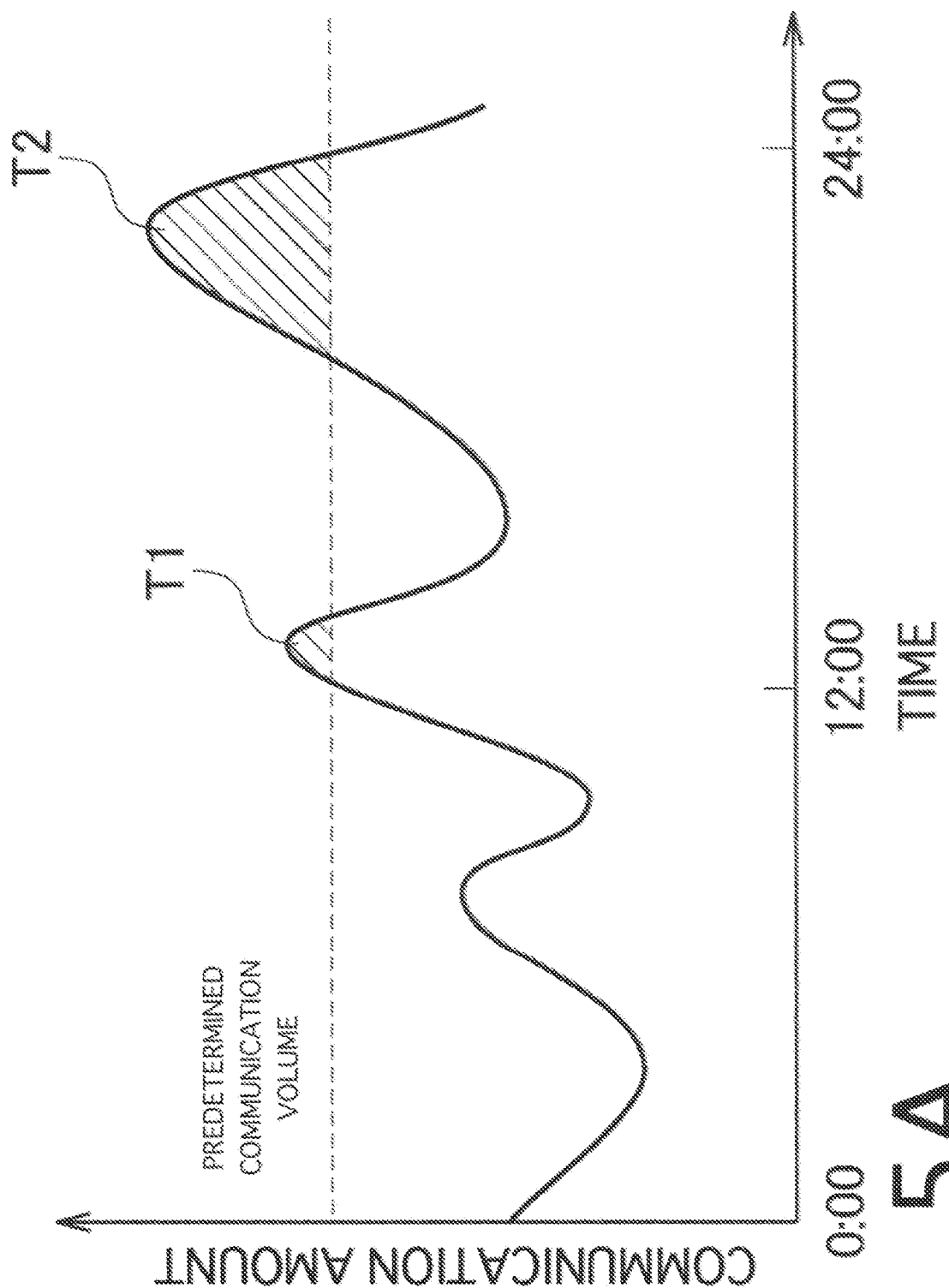
FIG. 5A is a diagram illustrating a relationship between the communication volume of the first communication unit and a time.
Figure 5B:
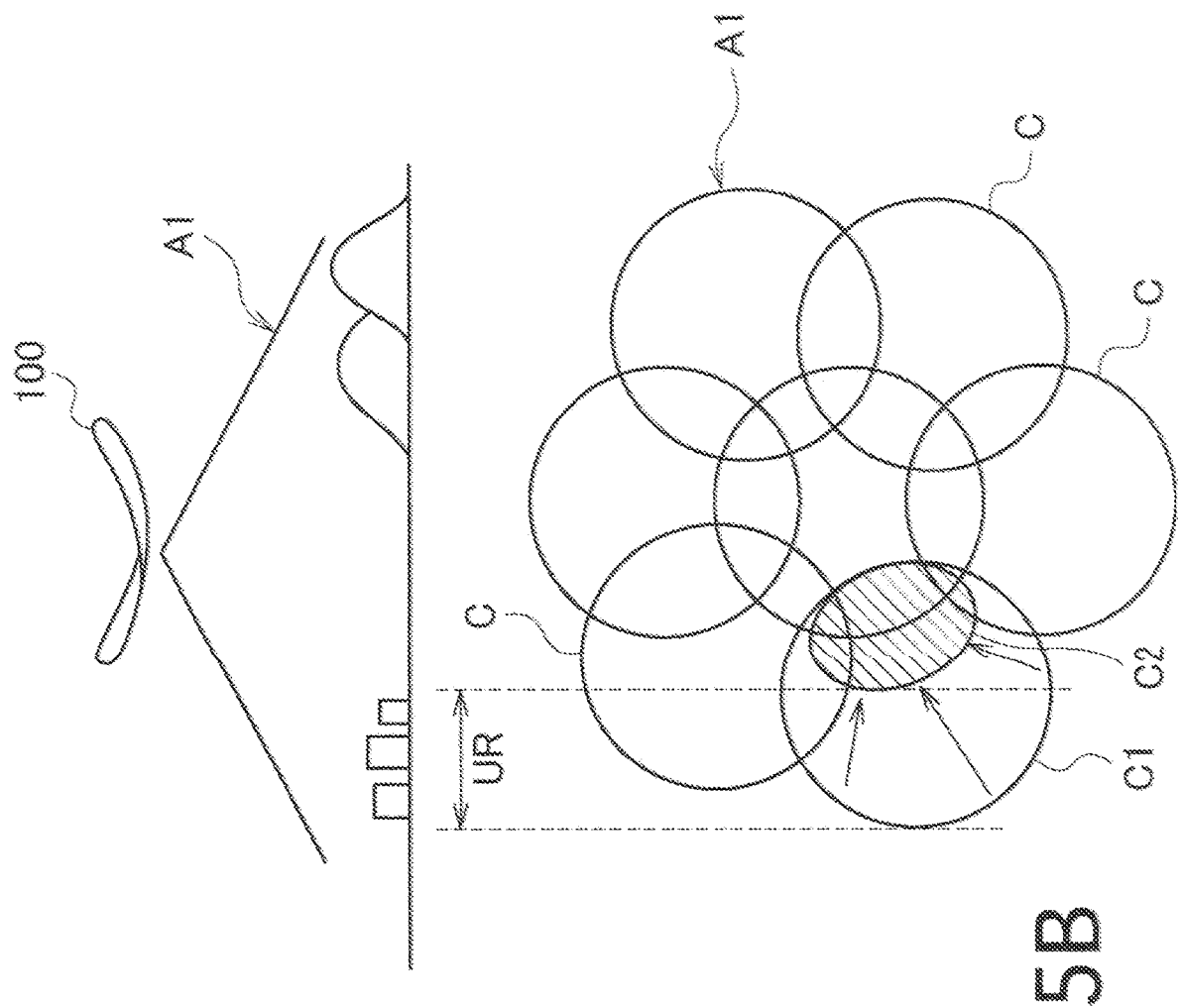
FIG. 5B is a diagram illustrating an example of narrowing a communication area of the first communication unit.

FIG. 4 is a flowchart illustrating an example of narrowing the communication area of the first communication unit. FIGS. 5A and 5B are diagrams illustrating an example of narrowing the communication area of the first communication unit. FIG. 5A is a diagram illustrating the relationship between the communication volume of the first communication unit and a time. FIG. 5B is a diagram illustrating an example of narrowing the communication area of the first communication unit.

As shown in FIG. 4, in step S31, the controller 28 determines whether the current time clocked by the clock unit 23 is in the predetermined time period identified in step S13 and step S22.

The time periods in which the communication volume exceeds the predetermined communication volume (power consumption exceeds the predetermined power) are directed to time periods T1 and T2, in the example shown in FIG. 5A. The time period T1 is roughly 12:00-13:00. The time period T2 is roughly 20:00-23:00. Accordingly, for example, the time periods identified in step S13 and step S22 are directed to the time period T1 and time period T2. When the current time is in the identified time period, or when the current time approaches the identified time period, the controller 28 determines that the current time is in the identified time period. In this example, the process proceeds to step S32. In contrast, if the controller 28 determines that the current time is not in the predetermined time period, the controller 28 makes the determination in step S31 again.

In step S32, the controller 28 controls the first communication unit 11 to narrow the communication area (footprint) of the first communication unit 11.

As shown in FIG. 5B as an example, the communication area of the first communication unit 11 mounted on the aircraft 100 includes the urban area UR and the surrounding areas of the urban area. Since it has been identified in advance that the large number of wireless terminals 51 are present in the urban area UR, excluding the urban area UR from the communication area μl of the first communication unit 11 allows the first communication unit 11 to continue communication with the wireless terminals 51 in the surrounding areas. In the example illustrated in FIG. 5B as an example, only the footprint of cell C1 is narrowed to be cell C2 since only the cell C1 as some of the multiple cells C that configure the communication area μl contains the urban area UR. Since it is considered that the base stations on the ground have already been installed in the area with the large number of wireless terminals 51 (urban area UR), even if the urban area UR is excluded from the communication area of the first communication unit 11, wireless terminals 51 present in the urban area UR are capable of continuing to communicate with the base stations on the ground.

The controller 28 possesses information on the narrow communication area in advance, when the urban area is excluded from the communication area of the first communication unit 11. Accordingly, the controller 28 transmits the information on the narrow communication area to the first communication unit 11 via the second communication unit 22, narrowing the communication area of the first communication unit 11.

Alternatively, the first communication unit 11 is capable of possessing in advance the information on the narrow communication area described above. In this example, the first communication unit 11 is capable of narrowing the communication area on the basis of the control signal transmitted from the control device 21 based on the control of the controller 28.

Next, advantageous effects achieved by the example will be described.

A communication device 1 includes: a power monitor 24 that monitors power consumption of a first communication unit 11; a communication speed monitor 25 that monitors communication speed of the communication performed by the first communication unit 11; a communication volume monitor 26 that monitors a communication volume of the communication performed by the first communication unit 11; a time period identification unit 27 that identifies a time period in which the power consumption of the first communication unit 11 exceeds a predetermined power on the basis of the power consumption monitored by the power monitor 24 and the time clocked by the clock unit 23, and a time period in which the communication speed of the first communication unit 11 falls below a predetermined communication speed on the basis of the communication speed monitored by the communication speed monitor 25 and the time clocked by the clock unit 23; and a controller 28 that narrows the communication area of the first communication unit 11 so that the communication volume monitored by the communication volume monitor 26 is less than or equal to a predetermined communication volume allowed by the first communication unit 11 when a current time clocked by the clock unit 23 is in the time period identified by the time period identification unit 27.

Since the time period in which the power consumption of the first communication unit 11 increases and the time period in which the communication speed of the communication performed by the first communication unit decreases are identified in advance, when the current time reaches the identified time period, the communication area of the first communication unit 11 may be narrowed down. This allows the communication device 1 to flexibly operate the first communication unit 11 since the power consumption of the first communication unit 11 does not exceed the allowable power and the communication speed of the communication performed by the first communication unit 11 does not decrease.

The time period identification unit 27 of the communication device 1 further identifies the time period in which the communication volume of the first communication unit 11 exceeds the predetermined communication volume on the basis of the communication volume monitored by the communication volume monitor 26 and the time clocked by the clock unit 23. In this example, the controller 28 narrows the communication area of the first communication unit 11 so that the communication volume monitored by the communication volume monitor 26 is less than or equal to the predetermined communication volume when the current time clocked by the clock unit 23 is in the time period identified by the time period identification unit 27 in which the communication volume exceeds the predetermined communication volume.

Since the time period in which the communication volume of the first communication unit 11 increases is identified in advance, the communication device 1 is capable of narrowing the communication area of the first communication unit 11 so that the communication volume of the first communication unit 11 is less than or equal to the allowed communication volume when the current time reaches the identified time period. This allows the communication device 1 to flexibly operate the first communication unit 11 since the power consumption of the first communication unit 11 does not exceed the allowable power due to an increase in the communication volume of the first communication unit 11, and the communication speed of the communication performed by the first communication unit 11 does not fall below the allowable communication speed.

The controller 28 of the communication device 1 identifies in advance areas where the number of wireless terminals is large, sets in advance a communication area other than the identified areas, and narrows the communication area of the first communication unit 11 on the basis of the setting.

The communication device 1 excludes areas with a large number of wireless terminals 51 such as urban areas, from the communication area, preventing the power consumption of the first communication unit 11 from exceeding the allowable power, and preventing the communication speed of the communication performed by the first communication unit 11 from falling below the allowable communication speed. Accordingly, the communication device 1 is capable of flexibly operating the first communication unit 11 even if the communication area of the first communication unit 11 includes the urban area.

The controller 28 of the communication device 1 sets a plurality of communication areas excluding the area identified as having a large number of wireless terminals 51, and narrows the communication area of the first communication unit 11 by applying one of the plurality of settings according to the current time clocked by the clock unit 23.

The communication device 1 is capable of excluding areas with a large number of wireless terminals 51 from the communication area even if the areas with a large number of wireless terminals 51 change according to the time period. This flexibly operates the first communication unit 11.

The first communication unit 11 of the communication device 1 is distributed in the aircraft 100 that stays in the air over a predetermined area.

That is, the communication device 1 uses HAPS technology with the first communication unit 11 mounted on the aircraft 100. This allows the communication device 1 to have a wider communication area compared to the base stations distributed on the ground. Even if the communication device 1 includes the urban area and the surrounding area of the urban area in its communication area, the communication device 1 is capable of continuing to operate the first communication unit 11 since the urban area is excluded from the communication area during the time period in which the power consumption of the first communication unit 11 may increase.

In addition, since the communication device 1 is capable of including the urban area in its communication area, even a wireless terminal 51 in an environment where it is difficult to communicate with a base station on the ground such as an alley in the urban area is allowed to communicate with the first communication unit 11.

In the communication device 1, the volume of traffic that may be processed by the first communication unit 11 per unit area of the communication area is relatively small since the first communication unit 11 is provided as an overhead station. Accordingly, since the communication device 1 identifies the time period in which congestion may occur due to excessive traffic concentration in the first communication unit 11, the communication area of the first communication unit 11 may be narrowed when the current time falls within the identified time period. This allows the communication device 1 to avoid an extreme decrease in the communication speed of the first communication unit 11, and also avoid consuming more power than expected even when an excessive concentration of traffic occurs in the first communication unit 11 at night in which it cannot receive external power supply such as solar power.

A control device 21 includes: a power monitor 24 that monitors a power consumption when communication is performed; a communication speed monitor 25 that monitors a communication speed when communication is performed; a communication volume monitor 26 that monitors a communication volume when communication is performed; a time period identification unit 27 that identifies a time period in which the power consumption when the communication is performed exceeds a predetermined power on the basis of the power consumption monitored by the power monitor 24 and the time clocked by the clock unit 23, and a time period in which the communication speed when the communication is performed falls below a predetermined communication speed on the basis of the communication speed monitored by the communication speed monitor 25 and the time clocked by the clock unit 23; and a controller 28 that narrows the communication area when the communication is performed so that the communication volume monitored by the communication volume monitor 26 is less than or equal to a predetermined communication volume allowed when the communication is performed, when a current time clocked by the clock unit 23 is in the time period identified by the time period identification unit 27.

When the current time reaches the identified time period, the control device 21 is capable of narrowing the communication area of the first communication unit 11 so that the communication volume when the communication is performed is less than or equal to the allowed communication volume. This allows the control device 21 to control the first communication unit 11 mounted on the aircraft 100 in a way that allows for flexible operation of the first communication unit 11 since the power consumption of the first communication unit 11 does not exceed the allowable power, and traffic concentration does not occur in the first communication unit 11.

A communication method causing a computer including a first communication unit 11 that communicates with a plurality of wireless terminals 51 in a predetermined communication area to perform the steps of: clocking a time; monitoring power consumption of the first communication unit 11; monitoring communication speed of the first communication unit 11; monitoring a communication volume of the communication performed by the first communication unit 11; identifying a time period in which the power consumption of the first communication unit 11 exceeds a predetermined power on the basis of the power consumption monitored in the power monitoring step and the time clocked in the time clocking step, and a time period in which the communication speed of the first communication unit 11 falls below a predetermined communication speed on the basis of the communication speed monitored in the communication speed monitoring step and the time clocked in the time clocking step; and narrowing the communication area of the first communication unit 11 so that the communication volume monitored in the communication volume monitoring step is less than or equal to a predetermined communication volume allowed by the first communication unit 11 when a current time clocked in the time clocking step is in the time period identified in the time period identifying step.

Since the time period in which the power consumption of the first communication unit 11 increases and the time period in which the communication speed of the communication performed by the first communication unit 11 decreases are identified in advance, the communication method is capable of narrowing the communication area of the first communication unit 11 when the current time reaches the identified time period. This allows the communication method to flexibly operate the first communication unit 11 since the power consumption of the first communication unit 11 does not exceed the allowable power, and the communication speed of the communication performed by the first communication unit 11 does not fall below the allowable communication speed.

A non-transitory computer readable recording medium storing a communication program causes a computer to perform the functions of: clocking a time; communicating with a plurality of wireless terminals 51 in a predetermined communication area; monitoring power consumption of the communicating function; monitoring communication speed of the communicating function; monitoring a communication volume of the communication performed by the communicating function; identifying a time period in which the power consumption of the communicating function exceeds a predetermined power on the basis of the power consumption monitored by the power monitoring function and the time clocked by the time clocking function, and a time period in which the communication speed of the communicating function falls below a predetermined communication speed on the basis of the communication speed monitored by the communication speed monitoring function and the time clocked by the time clocking function; and narrowing the communication area of the communicating function so that the communication volume monitored by the communication volume monitoring function is less than or equal to a predetermined communication volume allowed by the communicating function when a current time clocked by the time clocking function is in the time period identified by the time period identifying function.

Since the time period in which the power consumption of the communicating function increases is identified in advance, the communication program is capable of narrowing the communication area so that the communication volume of the communicating function is less than or equal to the allowable communication volume when the current time reaches the identified time period. This allows the communication program to flexibly operate the communicating function since the power consumption of the communicating function does not exceed the allowable power, and the communication speed of the communication performed by the communicating function does not fall below the allowable communication speed.

The invention claimed is:

1. A communication device comprising:
   a clock unit that clocks a time;
   a communication unit that communicates with a plurality of wireless terminals in a predetermined communication area;
   a communication volume monitor that monitors a communication volume of the communication performed by the communication unit;
   a power monitor that monitors power consumption of the communication unit;
   a time period identification unit that identifies a first time period corresponding to one or more first time intervals in which the power consumption of the communication unit exceeds a predetermined power based on the power consumption monitored by the power monitor and the time clocked by the clock unit, and a second time period corresponding to one or more second time intervals in which the communication volume of the communication unit exceeds a predetermined communication volume based on the communication volume monitored by the communication volume monitor and the time clocked by the clock unit; and
   a controller that narrows a communication area of the communication unit so that the communication volume monitored by the communication volume monitor is less than or equal to the predetermined communication volume on the basis of the communication volume monitored by the communication volume monitor, wherein
   the controller narrows the communication area of the communication unit so that the communication volume monitored by the communication volume monitor is less than or equal to the predetermined communication volume allowed by the communication unit when a current time clocked by the clock unit is in either the first time period or the second time period predetermined by the time period identification unit.

2. The communication device according to claim 1, wherein the controller narrows the communication area of the communication unit so that the communication volume monitored by the communication volume monitor is less than or equal to the predetermined communication volume when the current time clocked by the clock unit is in the second time period identified by the time period identification unit in which the communication volume exceeds the predetermined communication volume.

3. The communication device according to claim 2, wherein the controller identifies, in advance, areas where a number of wireless terminals is large, sets, in advance, a communication area other than the identified areas, and narrows the communication area of the communication unit on the basis of the setting.

4. The communication device according to claim 3, wherein the communication area other than the identified areas, which is set by the controller, includes a plurality of communication areas, and the controller narrows the communication area of the communication unit by applying one of a plurality of settings according to the current time clocked by the clock unit.

5. The communication device according to claim 4, wherein the communication unit is distributed on an aircraft that flies over a predetermined area.

6. The communication device according to claim 3, wherein the communication unit is distributed on an aircraft that flies over a predetermined area.

7. The communication device according to claim 2, wherein the communication unit is distributed on an aircraft that flies over a predetermined area.

8. The communication device according to claim 1, wherein the controller identifies, in advance, areas where a number of wireless terminals is large, sets, in advance, a communication area other than the identified areas, and narrows the communication area of the communication unit on the basis of the setting.

9. The communication device according to claim 8, wherein the communication area other than the identified areas, which is set by the controller, includes a plurality of communication areas, and the controller narrows the communication area of the communication unit by applying one of a plurality of settings according to the current time clocked by the clock unit.

10. The communication device according to claim 9, wherein the communication unit is distributed on an aircraft that flies over a predetermined area.

11. The communication device according to claim 8, wherein the communication unit is distributed on an aircraft that flies over a predetermined area.

12. The communication device according to claim 1, wherein the communication unit is distributed on an aircraft that flies over a predetermined area.

13. A control device comprising:
    a clock unit that clocks a time;
    a communication volume monitor that monitors a communication volume when communication is performed by a communication unit;
    a power monitor that monitors power consumption of the communication unit;
    a time period identification unit that identifies a first time period corresponding to one or more first time intervals in which the power consumption of the communication unit exceeds a predetermined power based on the power consumption monitored by the power monitor and the time clocked by the clock unit, and a second time period corresponding to one or more second time intervals in which the communication volume of the communication unit exceeds a predetermined communication volume on the basis of the communication volume monitored by the communication volume monitor and the time clocked by the clock unit; and a controller that narrows a communication area when communication is performed so that the communication volume monitored by the communication volume monitor is less than or equal to the predetermined communication volume based on the communication volume monitored by the communication volume monitor, wherein the controller narrows the communication area of the communication unit so that the communication volume monitored by the communication volume monitor is less than or equal to the predetermined communication volume allowed by the communication unit when a current time clocked by the clock unit is in either the first time period or the second time period predetermined by the time period identification unit.

14. A communication method that causes a computer including a communication unit that communicates with a plurality of wireless terminals in a predetermined communication area to perform the steps of:

clocking a time;

monitoring a communication volume of the communication performed by the communication unit;

monitoring power consumption of the communication unit;

identifying a first time period corresponding to one or more first time intervals in which the power consumption of the communication unit exceeds a predetermined power based on the power consumption monitored in the power monitoring step and the time clocked in the time clocking step, and a second time period corresponding to one or more second time intervals in which the communication volume of the communication unit exceeds a predetermined communication volume on the basis of the communication volume monitored in the communication volume monitoring step and the time clocked in the time clocking step; and controlling a communication area of the communication unit to be narrowed so that the communication volume monitored in the communication volume monitoring step is less than or equal to the predetermined communication volume based on the communication volume monitored in the communication volume monitoring step, wherein in the controlling step, the communication area of the communication unit is narrowed so that the communication volume monitored in the communication volume monitoring step is less than or equal to the predetermined communication volume allowed by the communication unit when a current time clocked in the time clocking step is in either the first time period or the second time period predetermined in the time period identifying step.

15. A non-transitory computer-readable recording medium storing a communication program that causes a computer to perform functions of:

clocking a time;

communicating with a plurality of wireless terminals in a predetermined communication area;

monitoring a communication volume of the communication performed by the communicating function;

monitoring power consumption of the communicating function;

identifying a first time period corresponding to one or more first time intervals in which the power consumption of the communicating function exceeds a predetermined power based on the power consumption monitored by the power monitoring function and the time clocked by the time clocking function, and a second time period corresponding to one or more second time intervals in which the communication volume of the communicating function exceeds a predetermined communication volume on the basis of the communication volume monitored by the communication volume monitoring function and the time clocked by the time clocking function; and controlling a communication area of the communicating function to be narrowed so that the communication volume monitored by the communication volume monitoring function is less than or equal to the predetermined communication volume based on the communication volume monitored by the communication volume monitoring function, wherein the controlling function narrows the communication area of the communicating function so that the communication volume monitored by the communication volume monitoring function is less than or equal to the predetermined communication volume allowed by the communicating function when a current time clocked by the time clocking function is in either the first time period or the second time period predetermined by the time period identifying function.

* * * * *